United States Patent [19]

Saito

[11] Patent Number: 5,712,910

[45] Date of Patent: Jan. 27, 1998

[54] RING TRIP CIRCUIT HAVING A SIMPLE TRIP DETECTING CIRCUIT OF A HIGH RESPONSE SPEED

[75] Inventor: Masashi Saito, Tokyo, Japan

[73] Assignee: NEC Corporation, Tokyo, Japan

[21] Appl. No.: 686,729

[22] Filed: Jul. 26, 1996

[30] Foreign Application Priority Data

Jul. 28, 1995 [JP] Japan ................................ 7-212656

[51] Int. Cl.[6] ................................................ H04M 1/00
[52] U.S. Cl. .................... 379/373; 379/350; 379/377; 379/382
[58] Field of Search ................................ 379/377, 382, 379/380, 373, 399, 418, 379

[56] References Cited

U.S. PATENT DOCUMENTS

| 3,829,619 | 8/1974 | Close et al. ........................... 379/379 |
| 4,524,245 | 6/1985 | Littlefield ............................ 379/373 |
| 5,140,631 | 8/1992 | Stahl .................................. 379/377 |

FOREIGN PATENT DOCUMENTS

| 0 116 291 | 8/1984 | European Pat. Off. ......... H04Q 3/00 |
| 0 165 516 | 5/1985 | European Pat. Off. ......... H04M 19/02 |
| 2-26446 | 1/1990 | Japan ............................. H04M 3/02 |

*Primary Examiner*—Krista M. Zele
*Assistant Examiner*—Taunya A. McCarty
*Attorney, Agent, or Firm*—Foley & Lardner

[57] ABSTRACT

In a ring trip circuit, a trip detecting circuit includes a low pass filter connected to opposite ends of a first resistor detecting an AC ringing signal, a diode bridge connected to an output of the low pass filter, a first series circuit connected to an output of the diode bridge and composed of a Zener diode and a light emitting diode of a first photocoupler, so that a phototransistor of the first photocoupler outputs a trip detection signal to a circuit which can be driven with a different power supply. A zero-crossing point detecting circuit has a second series circuit connected to the opposite ends of the first resistor and composed of a second resistor, a second Zener diode and a light emitting diode of a second photocoupler, so that a phototransistor of the second photocoupler outputs a zero-crossing point detection signal to a circuit which can be driven with a different power supply. A ringing signal supplying relay control circuit receives the trip detection signal and the zero-crossing point detection signal, for generating a switching signal at a zero-crossing point of the AC ringing signal.

7 Claims, 7 Drawing Sheets

RING TRIP CIRCUIT HAVING A SIMPLE TRIP DETECTING CIRCUIT OF A HIGH RESPONSE SPEED

BACKGROUND OF THE INVENTION

1. Field of the Invention

The present invention relates to a ring trip circuit for use in a subscriber's circuit in a telephone switching equipment.

2. Description of Related Art

The ring trip circuit is a circuit configured to detect that a subscriber has lifted up a hand set from a telephone set when an AC ringing signal is supplied to ring a telephone set, and to stop supplying of the AC ringing signal. The lifting of the hand set is called an "off-hook".

To ring the telephone set, an AC ringing signal having a high voltage of about 75 Vrms to 100 Vrms and a low frequency of about 16 Hz to 30 Hz, is supplied. Therefore, in order to prevent a malfunction from being caused by this AC ringing signal, it is necessary to surely detect with certainty the off-hook, namely the fact that the subscriber lifts up the hand set.

Figure 1:
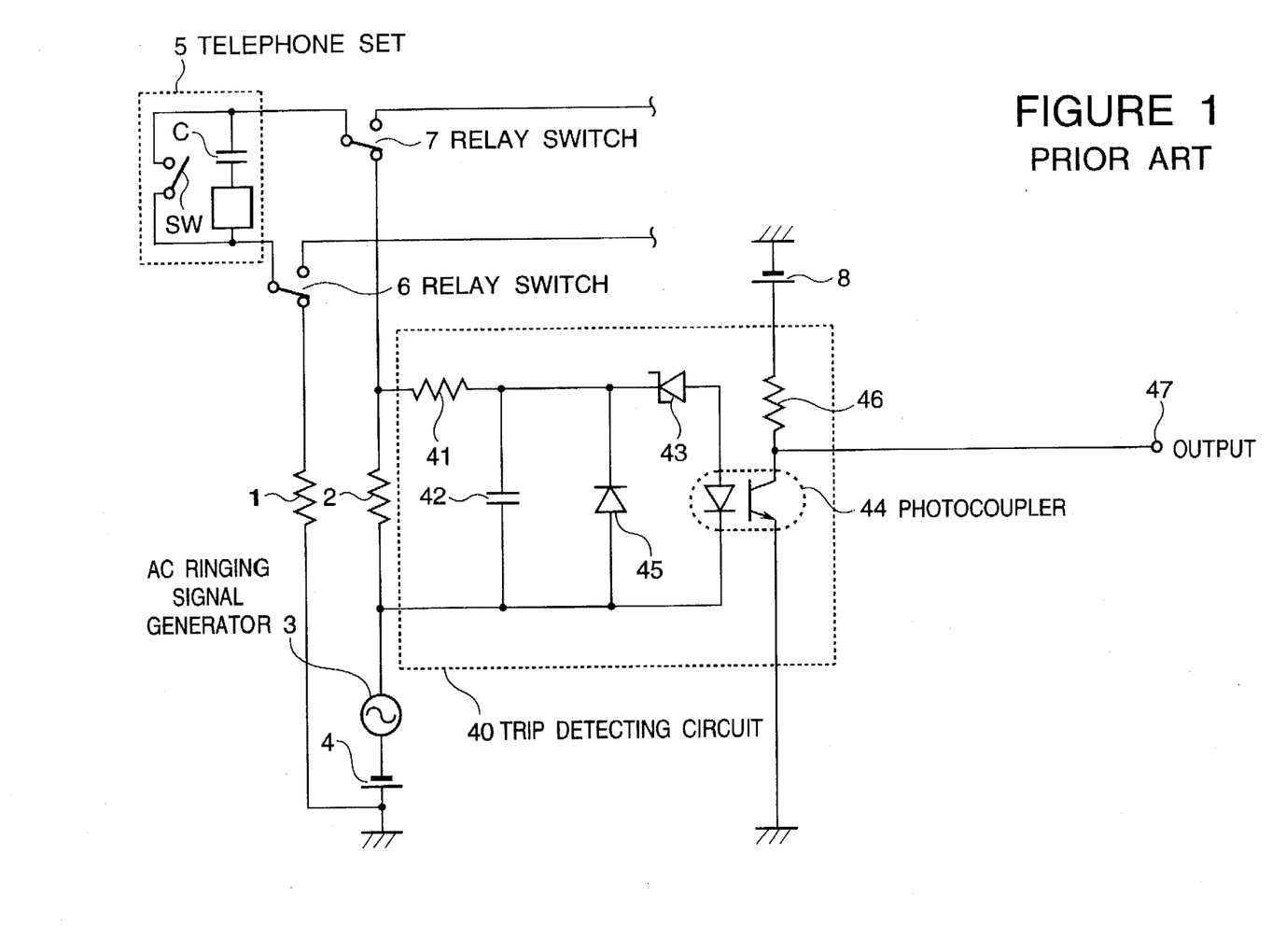
FIG. 1 is a circuit diagram of a first prior art example of the ring trip circuit comprising a low pass filter including a capacitor.

Referring to FIG. 1, there is shown a circuit diagram of a first prior art example of a ring trip circuit comprising a low pass filter including a capacitor.

As shown in FIG. 1, the first prior art example includes an AC ringing signal generator 3 for generating an AC ringing signal, a DC power supply 4 of about 48 V, a telephone set 5, a ringing signal supplying relay switches 6 and 7 for supplying and stopping the AC ringing signal, and resistors 1 and 2, which are connected in series as shown, in other words, to form a closed loop so as to ring the telephone set 5.

Opposite ends of the resistor 2 for detecting the AC ringing signal are connected to a trip detecting circuit 40, which includes a low pass filter connected to the opposite ends of the resistor 2 and composed of a resistor 41 and a capacitor 42 connected as shown. An output of the low pass filter is connected to a series circuit composed of a Zener diode 43 and a photocoupler 44, which are connected in series, with an anode of the Zener diode being connected to an anode of a light emitting diode of the photocoupler 44. In parallel to this series circuit, there is connected a diode 45 for preventing an overvoltage from being applied to the capacitor 42.

An emitter of a phototransistor of the photocoupler 44 is connected to ground, and a collector of the phototransistor of the photocoupler 44 is connected through a resistor 46 to a DC power supply 8. A connection node between the resistor 46 and the collector of the phototransistor of the photocoupler 44 is connected to an output terminal 47, which outputs a trip detection signal.

In the following, the anode and the cathode of the light emitting diode constituting an input side path of the photocoupler will be simply called an anode and a cathode of the photocoupler, respectively, and the collector and the emitter of the phototransistor constituting an output side path of the photocoupler will be simply called a collector and an emitter of the photocoupler, respectively.

Now, operation of the first prior art example will be explained with FIG. 1 as well as FIG. 2 which is a timing chart illustrating operation of the first prior art example.

In an on-hook condition in which a hand set is put on a telephone set, since a switch SW in the telephone set 5 is open, an AC component of the current flows through a capacitor C of the telephone set 5, but a DC component of the current does not flow through the capacitor C. Therefore, the DC component of the voltage across the resistor 2 is substantially zero (0 V).

On the other hand, in an off-hook condition, the switch SW in the telephone set 5 is closed, so that the DC component of the current flows. As a result, the DC component of the voltage between the opposite ends of the resistor 2 becomes about 15 V to 30 V.

Figure 2:
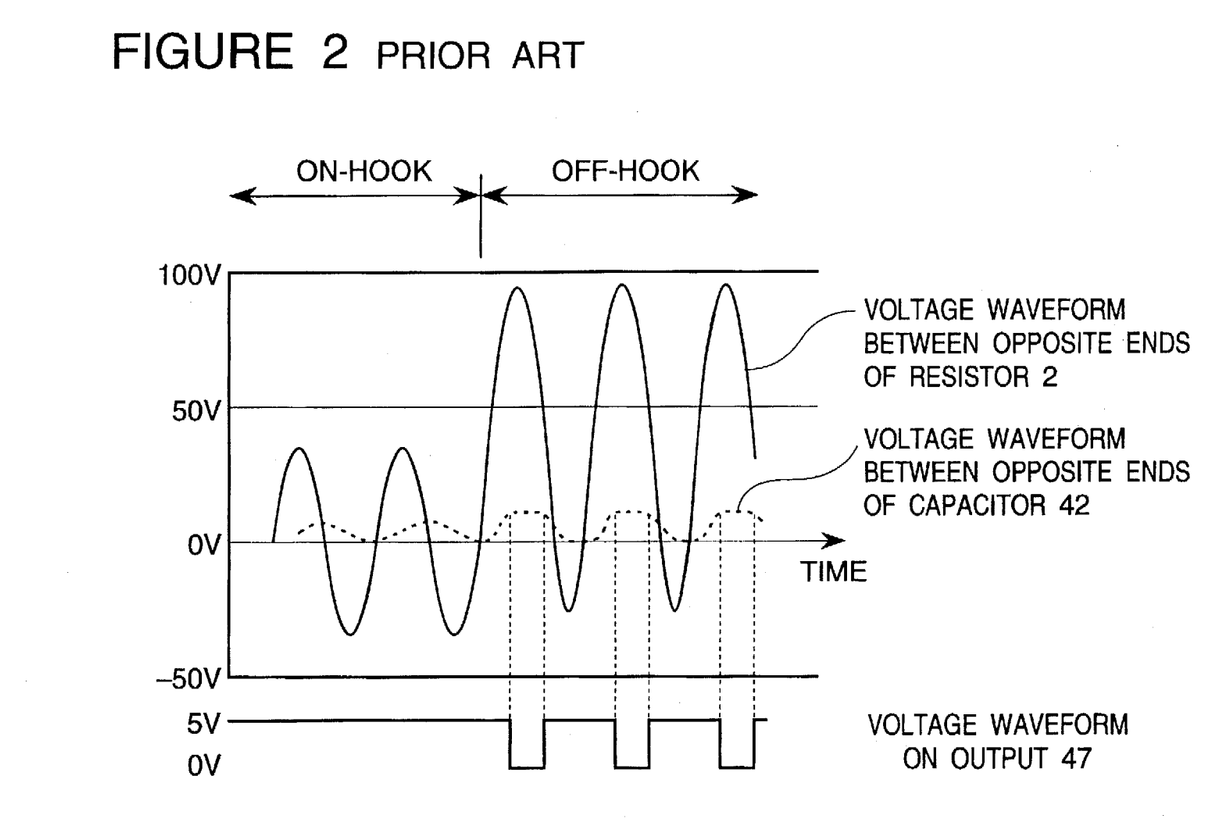
FIG. 2 is a timing chart illustrating an operation of the first prior art example shown in FIG. 1.

The voltage between opposite ends of the resistor 2 is depicted in a solid line in the timing chart of FIG. 2. It will be understood that the off-hook can be detected by a voltage difference between the on-hook condition and the off-hook condition; in the DC component of the voltage between the opposite ends of the resistor 2.

Therefore, in order to detect this voltage difference, the AC component is attenuated by the low pass filter composed of the resistor 41 and the capacitor 42, and it is so designed that, in the on-hook condition, the voltage between the opposite ends of the capacitor 42 will be smaller than an added voltage of a Zener voltage of the Zener diode 43 with a clamp voltage of the photocoupler 44, and in the off-hook condition, the voltage between the opposite ends of the capacitor 42 becomes larger than the added voltage of the Zener voltage of the Zener diode 43 with the clamp voltage of the photocoupler 44.

Thus, in the on-hook condition, no current flows through the Zener diode 43 and the photocoupler 44, but in the off-hook a current flows through the Zener diode 43 and the photocoupler 44. This current is represented by a waveform of the voltage between the opposite ends of the capacitor 42, depicted by a dotted line in FIG. 2.

Accordingly, since no current flows through the output side path (namely, phototransistor) of the photocoupler 44 in the on-hook condition, the output terminal 47 (of the trip detection circuit 40), which is driven with a different power supply, is brought to a constant high level. On the other hand, in the off-hook condition, since the current flows through the output side path of the photocoupler 44, a pulse voltage is generated at the output terminal 47, as shown in FIG. 2.

Thus, by detecting a low level of the pulse voltage, the off-hook can be detected, so that the ringing signal supplying relay switches 6 and 7 are switched over.

Figure 3:
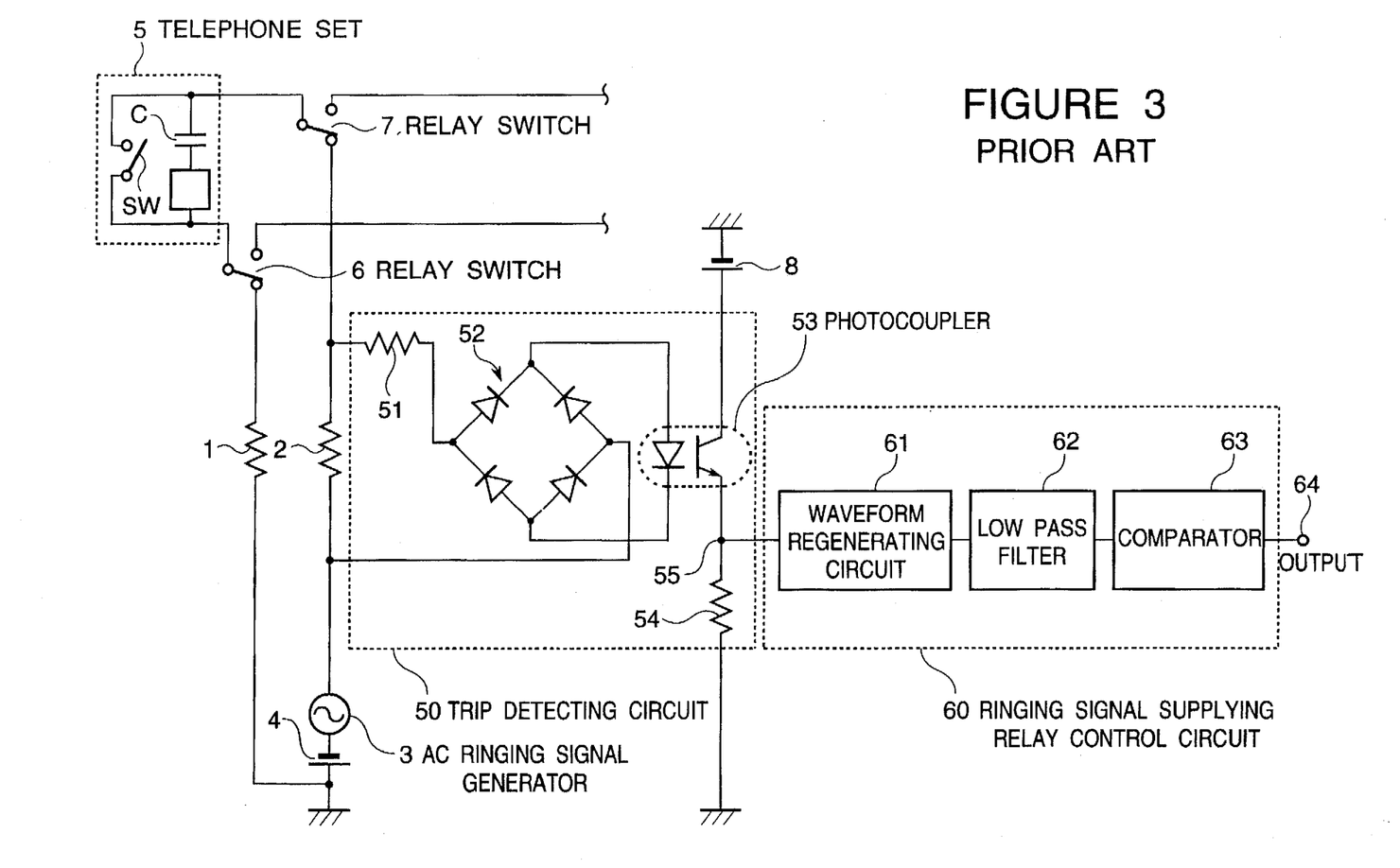
FIG. 3 is a circuit diagram of a second prior art example of the ring trip circuit, which does not comprise a low pass filter including a capacitor.

Referring to FIG. 3, there is shown a circuit diagram of a second prior art example of the ring trip circuit in which a capacitor is not used. In FIG. 3, elements similar to those shown in FIG. 1 are given the same Reference Numerals, and explanation thereof will be omitted.

As seen from comparison between FIGS. 1 and 3, the second prior art example is so configured that the opposite ends of the resistor 2 for detecting the AC ringing signal are connected to a trip detecting circuit 50, which includes a full-wave rectification circuit connected to the opposite ends of the resistor 2 and composed of a resistor 51 and a diode bridge 52 connected as shown. A pair of outputs of the full-wave rectification circuit are connected to an anode and a cathode of a photocoupler 53. A collector of the photocoupler 53 is connected to the DC power supply 8, and an emitter 55 of the photocoupler 53 is connected through a resistor 54 to ground. Namely, the output side path of the photocoupler is driven with a different power supply.

An output of the trip detection circuit 50, namely, the emitter 55 of the photocoupler 53, is connected to a ringing signal supplying relay control circuit 60, which comprises a waveform regenerating circuit 61 having an input connected the emitter 55 of the photocoupler 53, a low pass filter 62 having an input connected to an output of the waveform regenerating circuit 61, and a comparator 63 having an input connected to an output of the low pass filter 62 and an output connected to an output terminal 64.

Now, operation of the second prior art example will be explained with reference to FIG. 3 and FIG. 4 which is a timing chart illustrating operation of the second prior art example.

The voltage appearing between the opposite ends of the resistor 2 for detecting the AC ringing signal is similar to that in the first prior art example explained with reference to FIGS. 1 and 2.

Figure 4:
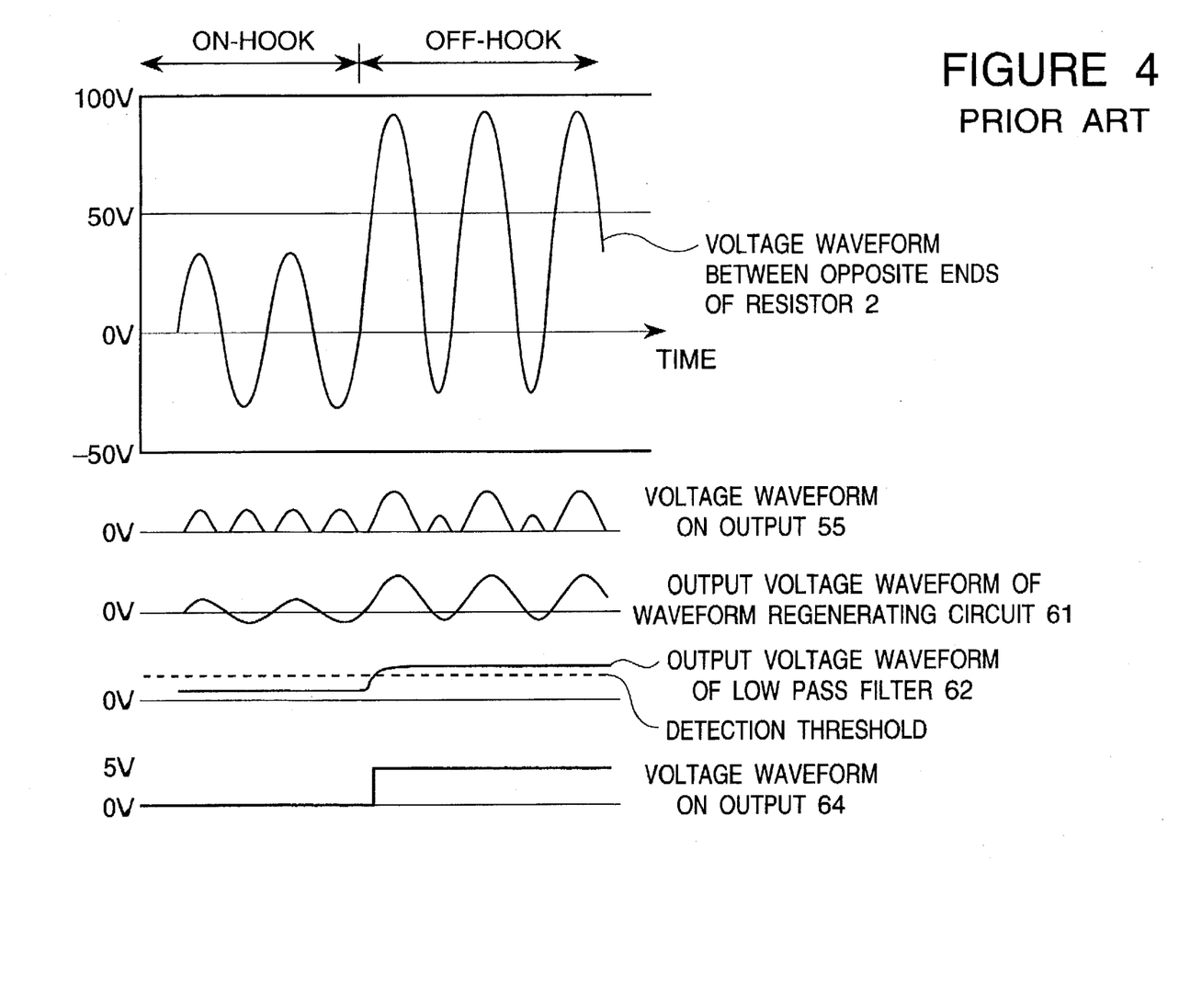
FIG. 4 is a timing chart illustrating an operation of the second prior art example shown in FIG. 3.

The voltage appearing between the opposite ends of the resistor 2, as shown in a solid line in FIG. 4, is rectified by the full-wave rectification circuit composed of the resistor 51 and the diode bridge 52, and the full-wave rectified voltage thus obtained drives the photocoupler 53, so that an analog trip detection signal is outputted from the emitter 55 of the phototransistor included in the trip detection circuit 50, to a circuit driven with a different power supply. This analog trip detection signal is shown as the output voltage waveform on the output 55 in FIG. 4.

The output signal 55 of the trip detection circuit is regenerated to an original waveform by the waveform regenerating circuit 61, as shown as the output voltage waveform of the waveform regenerating circuit 61 in FIG. 4.

An AC component of the regenerated original waveform is removed by the low pass filter 62, as shown as the output voltage waveform of the low pass filter 62 in FIG. 4.

The output voltage of the low pass filter 62 is compared with a detection threshold in the comparator 63, so that the result of comparison is outputted as a ring trip detection signal, as shown by the voltage waveform on the output 64 in FIG. 4.

Thus, the off-hook can be detected on the basis of the voltage of the ring trip detection signal 64, so that the ringing signal supplying relay switches 6 and 7 are switched over.

In addition, when the ringing signal supplying relay switches 6 and 7 are switched from the ringing signal circuit to a message channel in response to detection of the off-hook by the ring trip circuit, if the switching-over is not carried out in proximity of about 0 mA of the AC ringing signal, a counter electromotive force occurs in a bell coil and others of the telephone set, with the result that there is possibility that a fault occurs in the ringing signal supplying relays and circuits.

Therefore, a zero cross detecting circuit is required for detecting a zero-crossing point where the AC ringing signal becomes 0 mA, so that the ringing signal supplying relay switches 6 and 7 are switched over at the zero-crossing point.

Figure 5:
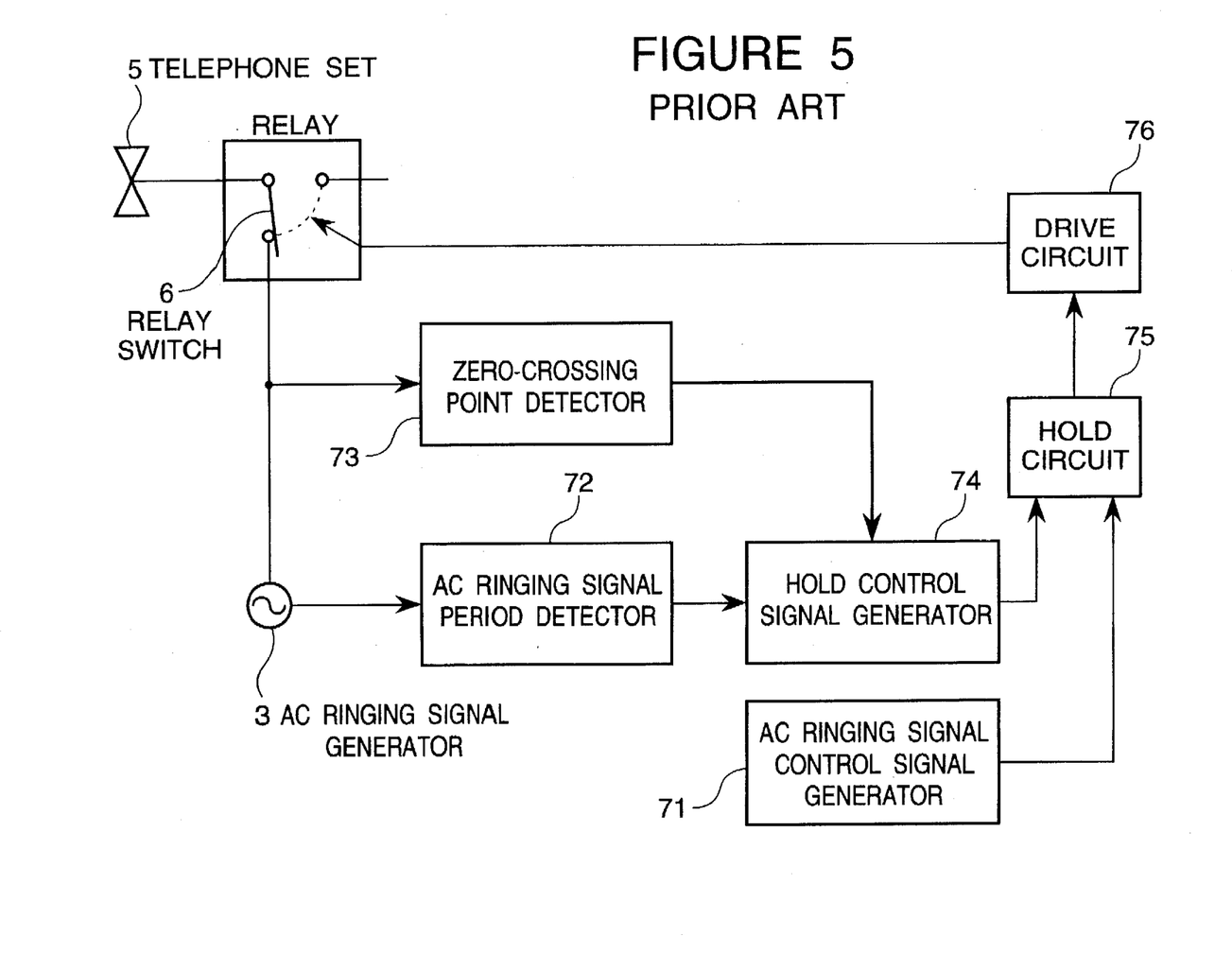
FIG. 5 is a circuit diagram of a third prior art example of the ring trip circuit.
Figure 7:
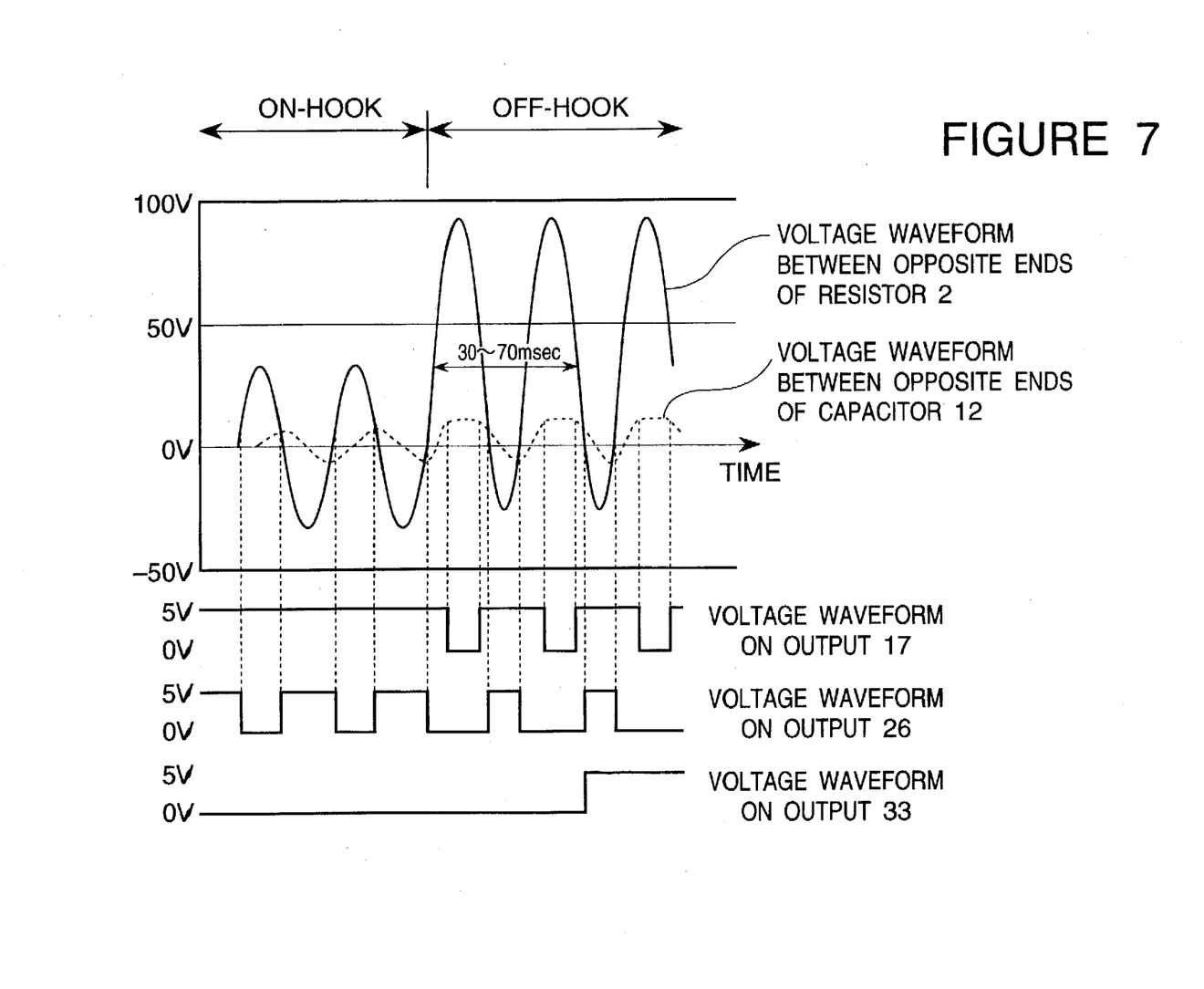
FIG. 7 is a timing chart illustrating an operation of the ring trip circuit shown in FIG. 6.

Referring to FIG. 5, there is shown a block diagram of a zero-crossing point detecting circuit disclosed in Japanese Patent Application Laid-open Publication No. JP-A-2-026446, which is configured to switch over the ringing signal supplying relay. In FIG. 7, elements similar to those shown in FIGS. 1 and 3 are given the same Reference Numerals, and explanation thereof will be omitted.

JP-A-2-026446 proposes to provide a period detecting circuit for detecting a period of the ringing signal, so that if the zero-crossing point of the ringing signal is detected, a next zero-crossing point is predicted, and the relay switches are switched over at the predicted time, to prevent occurrence of the fault. This proposal will be called a "third prior art example" hereinafter.

As shown in FIG. 5, the third prior art example includes an AC ringing signal control signal generator 71 for generating a signal controlling the supplying and the stopping of the AC ringing signal, an AC ringing signal period detector 72 for detecting the period of the AC ringing signal, a zero-crossing point detector 73 for detecting the zero-crossing point of the AC ringing signal, and a hold control signal generator 74 for outputting a set/reset signal for controlling the ringing signal supplying relay switch 6. This set/reset signal is generated in synchronism with an output of the AC ringing signal period detector 72, by delaying an output of the zero-crossing point detector 73. The third prior art example also includes a hold circuit 75 receiving an output of the AC ringing signal control signal generator 71 and an output of the hold control signal generator 74, for setting an operating condition of the ringing signal supplying relay switch 6 and holding the ringing signal supplying relay switch 6 in the set operating condition, and a drive circuit 76 controlled by the hold circuit 75, for driving the ringing signal supplying relay switch 6 for the purpose of executing the supplying and the stopping of the AC ringing signal.

Now, an operation of the third prior art example will be described.

If the supplying of the AC ringing signal is requested, the output of the AC ringing signal control signal generator 71 is brought to a high level. On the other hand, if the AC ringing signal generator 3 is in an operating condition, both the AC ringing signal period detector 72 and the zero-crossing point detector 73 ceaselessly carry out their detection operation, to output the result of their detection operation to the hold control signal generator 74.

The hold control signal generator 74 outputs the set/reset signal at a time, which is in synchronism with the detection output of the AC ringing signal period detector 72 but is delayed from the detection output of the zero-crossing point detector 73 by a delay time determined by taking in consideration a delay time of the ringing signal supplying relay switch 6, so that the ringing signal supplying relay switch 6 is switched over at a moment which is predicted to be a next zero-crossing point.

In response to this set/reset signal of the hold control signal generator 74 and the high level output of the AC ringing signal control signal generator 71, the hold circuit 75 controls the drive circuit 76 to cause the drive circuit 76 to drive the ringing signal supplying relay switch 6.

If the stopping of the AC ringing signal is requested, the output of the AC ringing signal control signal generator 71 is brought to a low level. And, the hold circuit 75 controls the drive circuit 76 to cause the drive circuit 76 to drive the ringing signal supplying relay switch 6, similarly to the above mentioned operation.

In the above mentioned first and second prior art examples shown in FIGS. 1 and 3, since the zero-crossing point detecting means is not provided, it is impossible to detect the zero-crossing point of the AC ringing signal. Because of this, it is not possible to prevent the counter electromotive force from occurring at the time of switching the ringing signal supplying relay switches 6 and 7.

In the first prior art example shown in FIG. 1, since the time constant of the low pass filter is as large as about 100 msec, the response speed is low. One reason for this is that, at the time of the on-hook, the voltage between the opposite ends of the capacitor 42 in a forward direction of the diode 45 is clamped by a forward direction voltage drop (for example, 4 V) of the diode 45, with the result the DC component of the voltage between the opposite ends of the capacitor 42 in the on-hook condition elevates about 4 V.

The AC ringing signal generator is divided into a continuous ringing type configured to ceaselessly output a sine wave of about 75 Vrms to 95 Vrms, and an interval ringing type configured to alternately output a sine wave of about 75 Vrms to 95 Vrms for one second and a voltage of 0 V for two seconds.

In the case that the AC ringing signal generator of the interval ringing type is used, the trip detection must be carried out at a silent time of the interval ringing, namely, when the voltage of 0 V is outputted. However, since the time constant of the low pass filter of the off-hook detecting circuit is large, the detection of the off-hook at the silent time requires a time much longer than that required when the AC ringing signal of the sine wave is supplied.

On the other hand, the second prior art example shown in FIG. 3 has a fast response speed, since it does not use the capacitor. But, since the second prior art example outputs the analog signal to the ringing signal supplying relay control circuit 60, the photocoupler 43 and the resistor 44 are required to have a high degree of precision. Furthermore, since the ringing signal supplying relay control circuit 60 includes the waveform regenerating circuit 61, the circuit construction is very complicated.

In the third prior art example shown in FIG. 5 having the zero-crossing point detecting circuit, when the telephone set is brought from the on-hook condition to the off-hook condition, since the switch included in the telephone set is closed, the impedance changes, with the result that the phase changes, and therefore the timing of the zero-crossing point changes. On the other hand, the AC ringing signal involves noise. Therefore, it is difficult to predict the next zero-crossing point. Furthermore, since the AC ringing signal period detector 72 and the zero-crossing point detector 73 are required in addition to the trip detecting circuit, the number of parts is very large.

SUMMARY OF THE INVENTION

Accordingly, it is an object of the present invention to provide a ring trip circuit which has overcomes the above mentioned defects of the prior art examples.

Another object of the present invention is to provide a ring trip circuit of a simple construction, which can be constructed of a reduced number of parts that do not require the degree of precision required in the prior art examples, and which can quickly carry out trip detection and zero-crossing detection, not only in the continuous ringing type but also in the interval ringing type, without malfunctioning as a result of noise included the AC ringing signal, so that the ringing signal supplying relay switches are switched over at the zero-crossing point of the AC ringing signal in response to the detection of the off-hook.

The above and other objects of the present invention are achieved in accordance with the present invention by a ring trip circuit including a trip detecting circuit having a low pass filter connected to opposite ends of a first resistor detecting an AC ringing signal, a diode bridge connected to an output of the low pass filter, a first series circuit connected to an output of the diode bridge and composed of a Zener diode and an input side path of a first photocoupler, so that an output side path of the first photocoupler outputs a trip detection signal to a circuit which can be driven with a different power supply.

Preferably, the ring trip circuit further includes a zero-crossing point detecting circuit having a second series circuit connected to the opposite ends of the first resistor and composed of a second resistor, a second Zener diode and an input side path of a second photocoupler, so that an output side path of the second photocoupler outputs a zero-crossing point detection signal to a circuit which can be driven with a different power supply; and a ringing signal supplying relay control circuit receiving the trip detection signal and the zero-crossing point detection signal, for generating a switching signal at a zero-crossing point of the AC ringing signal.

The zero-crossing point detecting circuit further includes a diode connected in parallel to a series connection of the second Zener diode and the input side path of the second photocoupler, for preventing a reverse breakdown voltage for the second photocoupler.

More specifically, the ringing signal supplying relay control circuit is configured to determine an off hook if the trip detection signal transits a predetermined number of times and if an interval between the transitions of the trip detection signal is not longer than a period of the AC ringing signal, and to output the switching signal in synchronism with an edge of the zero-crossing point detection signal.

For example, the low pass filter is composed of a resistor and a capacitor.

With the above mentioned arrangement, a switching signal for switching the ringing signal supplying relays, is outputted at the zero-crossing point of the AC ringing signal. Thus, the counter electromotive force, which would occur at the time of switching-over the ringing signal supplying relays, can be effectively prevented with the ring trip circuit which has a high response speed and which can be constructed with a reduced number of parts.

The above and other objects, features and advantages of the present invention will be apparent from the following description of preferred embodiments of the invention with reference to the accompanying drawings.

DESCRIPTION OF THE PREFERRED EMBODIMENTS

Figure 6:
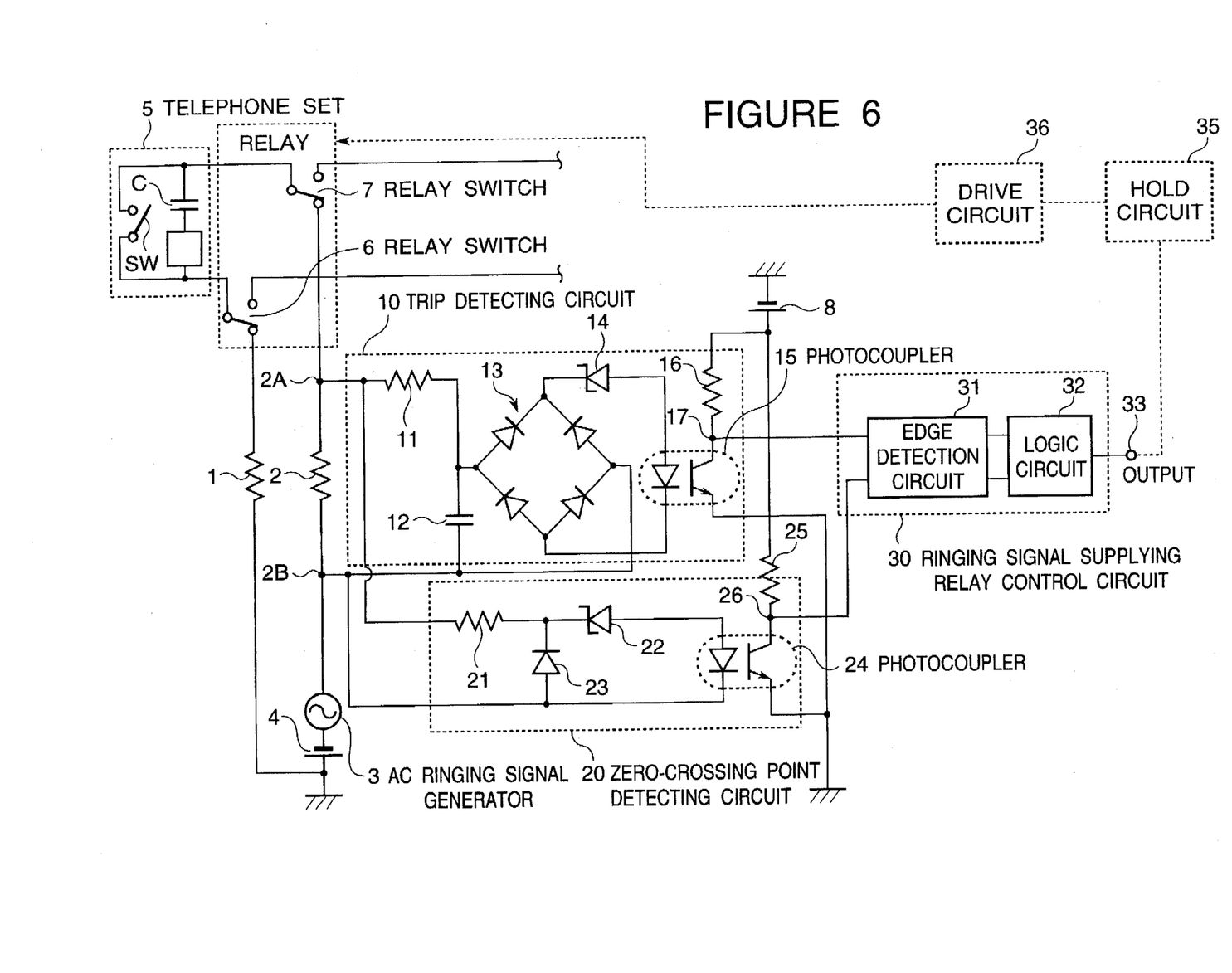
FIG. 6 is a circuit diagram of an embodiment of the ring trip circuit in accordance with the present invention.

Referring to FIG. 6, there is shown a circuit diagram of an embodiment of the ring trip circuit in accordance with the present invention. In FIG. 6, elements similar to those shown in FIGS. 1 and 3 are given the same Reference Numerals.

In the shown embodiment, one of a pair of terminals of a telephone set 5 is connected to a pole contact of a first single-pole double-throw relay switch 6, and a first selection contact of the relay switch 6 is connected through a resistor 1 to ground. The other terminal of the telephone set 5 is connected to a pole contact of a second single-pole double-throw relay switch 7, and a first selection contact of the relay switch 7 is connected to one end of an AC ringing signal generator 3 through a resistor 2 for detecting the AC ringing signal. The other end of this AC ringing signal generator 3 is connected to a negative terminal of a DC power supply 4, which in turn has a positive terminal connected to the ground.

Respective second selection contacts of the single-pole double-throw relay switches 6 and 7 are connected to a pair of message channel lines, respectively.

Opposite ends 2A and 2B of the resistor 2, for detecting the AC ringing signal, are connected to a trip detection circuit 10. This trip detection circuit 10 comprises a low pass filter composed of a resistor 11 having one end connected to the first end 2A of the resistor 2 and a capacitor 12 having one end connected to the other end of the resistor 11 and the other end connected to the second end 2B of the resistor 2. The trip detection circuit 10 also includes a diode bridge 13 connected to an output of the low pass filter. Namely, a pair of input terminals of the diode bridge 13 are connected to the one end and the other end of the capacitor 12, respectively.

A pair of output terminals of the diode bridge 13 are connected to opposite ends of a series circuit consisting of a Zener diode 14 and a light emitting diode of a photocoupler 15. More specifically, one of the pair of output terminals of the diode bridge 13 is connected to a cathode of the Zener diode 14, which in turn has an anode connected to an anode of the photocoupler 15. A cathode of the photocoupler 15 is connected to the other output terminal of the diode bridge 13.

An emitter of the photocoupler 15 is connected to ground, and a collector of the photocoupler 15 is connected through a resistor 16 to a positive terminal of another DC power supply 8, which has a negative terminal connected to the ground. The collector of the photocoupler 15 is also connected to an output terminal 17, which can output, at the time of an off-hook, a trip detection signal, to a circuit driven with a different power supply.

The opposite ends 2A and 2B of the resistor 2 are also connected to a zero-crossing point detecting circuit 20, which includes a series circuit composed of a resistor 21, a Zener diode 22 and a light emitting diode of another photocoupler 24. More specifically, the first end 2A of the resistor 2 is connected to one end of the resistor 21, which has the other end connected to a cathode of the Zener diode 22. An anode of the Zener diode 22 is connected to an anode of the photocoupler 26, whose cathode is connected to the second end 2B of the resistor 2. A diode 23 for preventing a reverse breakdown voltage for the photocoupler 24 is connected at its cathode to the cathode of the Zener diode 22 and at its anode to the cathode of the photocoupler 24.

An emitter of the photocoupler 24 is connected to ground, and a collector of the photocoupler 24 is connected through a resistor 25 to the positive terminal of the DC power supply 8. The collector of the photocoupler 24 is also connected to an output terminal 26, which can output a zero-crossing point detection signal, to a circuit driven with a different power supply.

The shown embodiment also includes a ringing signal supplying relay control circuit 30, which includes an edge detection circuit 31 receiving the trip detection signal 17 outputted from the output terminal 17 of the trip detection circuit 10 and the zero-crossing detection signal 26 outputted from the zero-crossing point detection circuit 20, and a logic circuit 32 having an input connected to an output of the edge detection circuit 31 and an output connected to an output terminal 33 for outputting a signal for switching over the ringing signal supplying relay switches 6 and 7 at the zero-crossing point of the AC ringing signal.

The signal outputted from the output terminal 33 is supplied to, for example, a hold circuit 35 which is similar to the hold circuit 75 shown in FIG. 5, and which is shown in a dotted line in FIG. 6. An output of the hold circuit 35 is connected to for example a drive circuit 36, which is also shown in a dotted line in FIG. 6, and which is similar to the drive circuit 76 shown in FIG. 5. This drive circuit 36 drives a relay including the relay switches 6 and 7.

Now, operation of the shown embodiment will be described with reference to FIG. 6 and FIG. 7 which is a timing chart illustrating an operation of the ring trip circuit shown in FIG. 6.

In the trip detection circuit 10, an AC component of the AC ringing signal is attenuated by the low pass filter composed of the resistor 11 and the capacitor 12. Therefore, the trip detection circuit 10 is so designed that, in the on-hook condition, the voltage between the opposite ends of the capacitor 12 will be smaller than an added voltage of the clamp voltage (i.e., forward direction voltage drop) of the diode bridge 13, the Zener voltage of the Zener diode 14 and the clamp voltage (i.e., forward direction voltage drop) of the photocoupler 15, and in the off-hook condition, the voltage between the opposite ends of the capacitor 12 becomes larger than the added voltage of the clamp voltage of the diode bridge 13, the Zener voltage of the Zener diode 14 and the clamp voltage of the photocoupler 15.

With this arrangement, in the on-hook condition, no current flows through the diode bridge 13, the Zener diode 14 and the photocoupler 15, but in the off-hook condition, a current flows through the diode bridge 13, the Zener diode 14 and the photocoupler 15. This is illustrated by a waveform of the voltage between opposite ends of the capacitor 12, depicted by a dotted line in FIG. 7.

As mentioned above, since in the on-hook condition, no current flows through the photocoupler 15, the output voltage of the output terminal 17, which is driven with a different power supply, is maintained at a constant level of a high level. On the other hand, since in the off-hook condition, a current flows through an output side path (phototransistor) of the photocoupler, the output voltage of the output terminal 17 becomes a pulsed waveform, as shown in FIG. 7.

In this condition, since the diode bridge 13 is incorporated, the voltage between the opposite ends of the capacitor 12 is not clamped by a forward direction voltage drop of a diode, differently from the voltage between the opposite ends of the capacitor 42 in the first prior art example shown in the timing chart of FIG. 2. Therefore, the DC component of the voltage between the opposite ends of the capacitor 12 in the on-hook condition is lowered by about 3 V, as compared with the first prior art example.

As a result, the time constant can be reduced to about 70 msec, and therefore, the trip detection circuit 10 can have a response speed faster than the trip detection circuit 40 of the first prior art example.

In the zero-crossing point detecting circuit 20, the zero-crossing point of the AC ringing signal is at the moment the voltage between the opposite ends of the ringing signal detecting resistor 2 is 0 V.

Here, an added voltage of a Zener voltage of the Zener diode 22 and a clamp voltage of the photocoupler 24 (for outputting the zero-crossing point detection signal to a circuit driven with a different power supply), constitutes a zero-crossing point detecting threshold voltage. The reason for this is: Since the ringing signal supplying relay switches 6 and 7 involve a delay on the order of about 1 msec, only the clamp voltage of the photocoupler 24 is too low as the zero-crossing point detecting threshold voltage, with the result that the voltage goes past the zero-crossing point after the zero-crossing point is detected before the ringing signal supplying relay switches 6 and 7 are actually operated.

Accordingly, by setting the zero-crossing point detecting threshold voltage to a level in the range of about 3 V to about 6 V, it is possible to make the delay time of the ringing signal supplying relay switches 6 and 7, equal to the time in which the AC ringing signal changes from the detection detection threshold to 0 V. Therefore, the zero-crossing point detecting threshold voltage is determined by using the Zener diode 22.

With this arrangement, if the voltage across the ringing signal detecting resistor 2 becomes higher than the zero-crossing point detecting threshold voltage, the voltage of the output 26 of the zero-crossing point detecting circuit 20 is brought to a low level, as shown in FIG. 7, and if the voltage across the ringing signal detecting resistor 2 becomes lower than the zero-crossing point detecting threshold voltage, the voltage of the output 26 of the zero-crossing point detecting circuit 20 is brought to a high level, as shown in FIG. 7.

Thus, a rising point of the voltage waveform of the output 26 of the zero-crossing point detecting circuit 20 becomes the zero-crossing point of the AC ringing signal.

In the ringing signal supplying relay control circuit 30, the edge detection circuit 31 detects the ringing edge and the falling edge of the output voltage 17 of the trip detection circuit 10 and the output voltage 26 of the zero-crossing point detecting circuit 20, and the logic circuit 32 brings the output 33 to a high level at the rising of the output voltage 26 of the zero-crossing point detecting circuit 20, after the falling of the output voltage 17 of the trip detection circuit 10 is counted two times.

The reason for this is: Taking the noise of the AC ringing signal into consideration, it is judged to be the off-hook if the output voltage at the output terminal 17 of the trip detection circuit 10 falls down two times and if an interval between the two falling edges is substantially equal or alternatively not greater than one period of the AC ringing signal (about 30 msec to about 70 msec). On the basis of this judgement of the off-hook, the control signal 33 for switching over the ringing signal supplying relay switches 6 and 7 is supplied at the rising of the output voltage 26 of the zero-crossing point detecting circuit 20, as shown in FIG. 7.

During a silent period in the interval ringing type ringing signal, the trip detection must be carried out. If it is put into the off-hook condition during the silent period, the output voltage 26 of the zero-crossing point detecting circuit 20 is brought to the high level. Therefore, by introducing a circuit for detecting this condition, into the logic circuit, it becomes possible to detect the trip for a short time.

As seen from the above, in the trip detecting circuit in accordance with the prevent invention, the time constant of the low pass filter used in the trip detecting circuit is small, and the zero-crossing point detecting circuit can detect the zero-crossing point with a reduced number of parts. Therefore, the counter electromotive force, which would occur at the time of switching over the ringing signal supplying relays, can be effectively prevented with the ring trip circuit which has a high response speed and which can be constructed with a reduced number of parts.

The invention has thus been shown and described with reference to the specific embodiments. However, it should be noted that the present invention is in no way limited to the details of the illustrated structures but changes and modifications may be made within the scope of the appended claims.

I claim:

1. A ring trip circuit comprising:
    a trip detecting circuit having a low pass filter connected to opposite ends of a first resistor detecting an AC ringing signal;
    a diode bridge connected to an output of said low pass filter;
    a first series circuit connected to an output of said diode bridge and composed of a Zener diode and an input side path of a first photocoupler, so that an output side path of said first photocoupler outputs a trip detection signal;
    a zero-crossing point detecting circuit having a second series circuit connected to said opposite ends of said first resistor and composed of a second resistor, a second Zener diode and an input side path of a second photocoupler, so that an output side path of said second photocoupler outputs a zero-crossing point detection signal; and
    a ringing signal supplying relay control circuit receiving said trip detection signal and said zero-crossing point detection signal, for generating a switching signal at a zero-crossing point of said AC ringing signal.

2. A ring trip circuit claimed in claim 1 wherein said zero-crossing point detecting circuit further includes a diode connected in parallel to a series connection of said second Zener diode and said input side path of said second photocoupler, for preventing a reverse breakdown voltage for said second photocoupler.

3. A ring trip circuit claimed in claim 1 wherein said ringing signal supplying relay control circuit is configured to determine an off hook if said trip detection signal transits a predetermined number of times and if an interval between the transitions of said trip detection signal is not longer than a period of said AC ringing signal, and to output said switching signal in synchronism with an edge of said zero-crossing point detection signal.

4. A ring trip circuit claimed in claim 1 wherein said low pass filter is composed of a resistor and a capacitor.

5. A ring trip circuit for a telephone set having a pair of terminals connected to a pair of message channel lines, the ring trip circuit comprising:
    a first DC power supply having a positive terminal and a negative terminal, said positive terminal being connected through a first relay switch to one terminal of said pair of terminals of said telephone set;
    an AC ringing signal generator having a pair of output terminals, one terminal of said pair of output terminals being connected to said negative terminal of said first DC power supply;
    a first resistor having a first end connected to the other terminal of said pair of output terminals of said AC ringing signal generator, a second end of said first resistor being connected through a second relay switch to the other terminal of said pair of terminals of said telephone set;
    a trip detecting circuit having
        a low pass filter composed of a second resistor having one end connected to said first end of said first resistor and a capacitor having one end connected to the other end of said second resistor, the other end of said capacitor being connected to said second end of said first resistor;

a diode bridge having a pair of input terminals and a pair of output terminals, said pair of input terminals of said diode bridge being connected to the one end and the other end of said capacitor, respectively; and a first series circuit composed of a Zener diode and a light emitting diode of a first photocoupler, a cathode of said Zener diode being connected to one terminal of said pair of output terminals of said diode bridge, an anode of said Zener diode being connected to an anode of said light emitting diode of said first photocoupler, a cathode of said light emitting diode of said first photocoupler being connected to the other terminal of said pair of output terminals of said diode bridge, an emitter of a phototransistor of said first photocoupler being connected to a fixed voltage, and a collector of said phototransistor of said first photocoupler being connected through a third resistor to a second DC power supply, so that a trip detection signal is outputted from said collector of said phototransistor of said first photocoupler; and a control circuit receiving said trip detection signal for outputting a switching signal for controlling a relay which drives said first relay switch and said second relay switch.

6. A ring trip circuit claimed in claim 5 further including a zero-crossing point detecting circuit having a second series circuit composed of a fourth resistor, a second Zener diode and a light emitting diode of a second photocoupler, one end of said fourth resistor being connected to said first end of said first resistor, the other end of said fourth resistor being connected to a cathode of said second Zener diode, an anode of said second Zener diode being connected to an anode of said light emitting diode of said second photocoupler, a cathode of said light emitting diode of said second photocoupler being connected to said second end of said first resistor, an emitter of a phototransistor of said second photocoupler being connected to said fixed voltage, and a collector of said phototransistor of said second photocoupler being connected through a fifth resistor to said second DC power supply, so that a zero-crossing point detection signal is outputted from said collector of said phototransistor of said second photocoupler, said zero-crossing point detecting circuit also including a protection diode having a cathode connected to said cathode of said second Zener diode and an anode connected to said cathode of said light emitting diode of said second photocoupler, for preventing a reverse breakdown voltage for said second photocoupler, and wherein said control circuit receiving said zero-crossing point detection signal in addition to said trip detection signal, for outputting said switching signal at a zero-crossing point of said AC ringing signal.

7. A ring trip circuit claimed in claim 6 wherein said control circuit is configured to determine an off hook if said trip detection signal transits two times and if an interval between the transitions of said trip detection signal is not longer than a period of said AC ringing signal, and to output said switching signal in synchronism with an edge of said zero-crossing point detection signal.

* * * * *